(12) United States Patent
Tanaka et al.

(10) Patent No.: US 9,681,281 B2
(45) Date of Patent: Jun. 13, 2017

(54) MOBILE COMMUNICATION SYSTEM, NETWORK APPARATUS, MOBILE STATION, AND MOBILE COMMUNICATION METHOD

(71) Applicant: NTT DOCOMO, INC., Tokyo (JP)

(72) Inventors: Itsuma Tanaka, Tokyo (JP); Shin-ichi Isobe, Tokyo (JP); Takashi Koshimizu, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/415,887

(22) PCT Filed: Jul. 18, 2013

(86) PCT No.: PCT/JP2013/069524
§ 371 (c)(1),
(2) Date: Jan. 20, 2015

(87) PCT Pub. No.: WO2014/014056
PCT Pub. Date: Jan. 23, 2014

(65) Prior Publication Data
US 2015/0181403 A1 Jun. 25, 2015

(30) Foreign Application Priority Data

Jul. 19, 2012 (JP) ................................. 2012-160685

(51) Int. Cl.
*H04M 11/04* (2006.01)
*H04W 4/22* (2009.01)
(Continued)

(52) U.S. Cl.
CPC ............ *H04W 4/22* (2013.01); *H04W 48/06* (2013.01); *H04W 28/0284* (2013.01)

(58) Field of Classification Search
USPC ...................................... 455/404.1, 418, 419
See application file for complete search history.

(56) References Cited

U.S. PATENT DOCUMENTS

2010/0014497 A1* 1/2010 Aggarwal ............... H04W 4/02
370/338
2011/0302310 A1 12/2011 Diachina et al.
2013/0143512 A1* 6/2013 Hernandez .............. H04W 4/00
455/404.1

FOREIGN PATENT DOCUMENTS

JP 2006-180187 A 7/2006
JP 2006-340294 A 12/2006
(Continued)

OTHER PUBLICATIONS

International Search Report for corresponding International Application No. PCT/JP2013/069524, mailed Sep. 10, 2013 (2 pages).
(Continued)

*Primary Examiner* — Joel Ajayi
(74) *Attorney, Agent, or Firm* — Osha Liang LLP

(57) ABSTRACT

A UE (20A) includes an application control information holding unit (23) configured to hold application control information at least including identification information of an application (21) to be restricted or permitted to perform communications among the multiple applications (21); a restriction instruction reception unit (24) configured to receive, via a radio base station, a communication restriction instruction to control communications of the application (21) to be restricted or permitted to perform communications among the multiple applications (21); and a restriction instruction notification unit (25) configured to notify an upper layer, which is configured to implement communications with the application (21), of reception of the communication restriction instruction based on the communication restriction instruction received by the restriction instruction reception unit (24).

14 Claims, 14 Drawing Sheets

(51) Int. Cl.
*H04W 48/06* (2009.01)
*H04W 28/02* (2009.01)

(56) References Cited

FOREIGN PATENT DOCUMENTS

| JP | 2009-177262 A | 8/2009 |
|---|---|---|
| WO | 2012/013355 A1 | 2/2012 |
| WO | 2012/020338 A1 | 2/2012 |

OTHER PUBLICATIONS

Written Opinion for corresponding International Application No. PCT/JP2013/069524, mailed Sep. 10, 2013 (3 pages).
3GPP TS 36.331 V11.0.0; "3rd Generation Partnership Project; Technical Specification Group Radio Access Network; Evolved Universal Terrestrial Radio Access (E-UTRA); Radio Resource Control (RRC); Protocol specification (Release 11);" Jun. 2012 (302 pages).
3GPP TS 24.301 V11.3.0; "3rd Generation Partnership Project; Technical Specification Group Core Network and Terminals; Non-Access-Stratum (NAS) protocol for Evolved Packet System (EPS); Stage 3 (Release 11);" Jun. 2012 (333 pages).
3GPP TS 22.011 V11.2.0; "3rd Generation Partnership Project; Technical Specification Group Services and System Aspects; Service accessibility (Release 11);" Dec. 2011 (26 pages).
Extended European Search Report in counterpart European Application No. 13 82 0251.0 issued Feb. 23, 2016 (10 pages).
Motorola Mobility et al; "Conclusions for Traffic Identification based Application"; 3GPP SA WG2 Meeting #88, S2-115284; San Francisco, USA; Nov. 14-18, 2011 (6 pages).
Intel Corporation; "EAB for RAN overload protection"; 3GPP TSG RAN WG2 Meeting #74, R2-113217; Barcelona, Spain; May 9-13, 2011 (4 pages).
Notification of Reasons for Refusal issued in corresponding Japanese Application No. 2012-160685, mailed on May 10, 2016 (4 pages).

* cited by examiner

FIG. 4
(a)
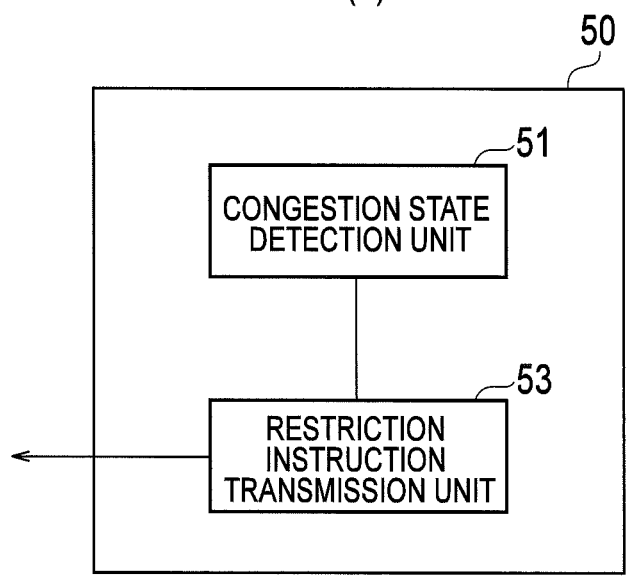
(b)
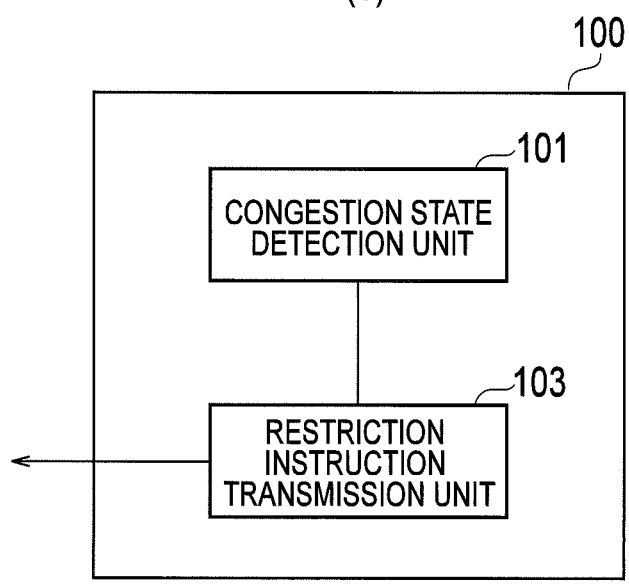

FIG. 8
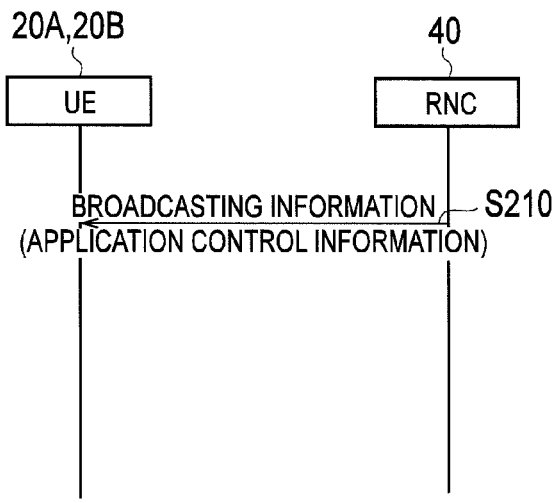
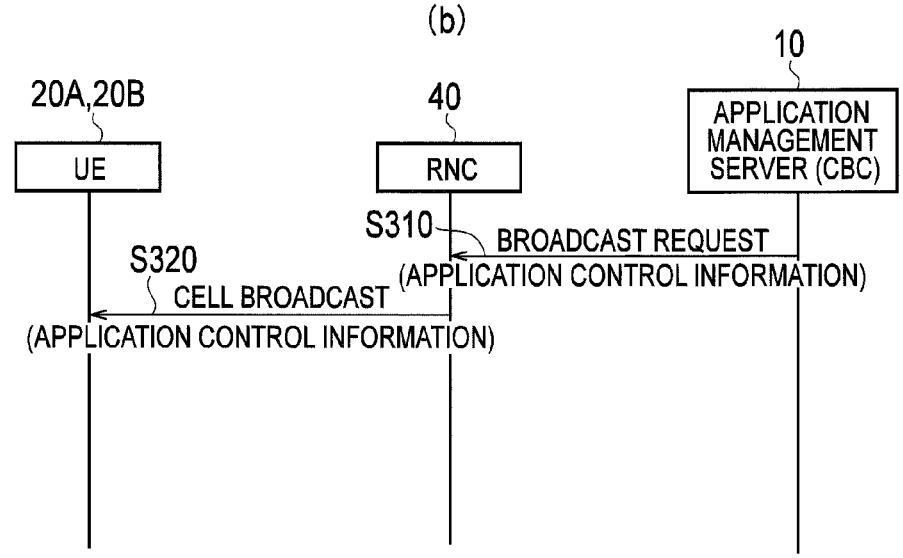

FIG. 11
(a)
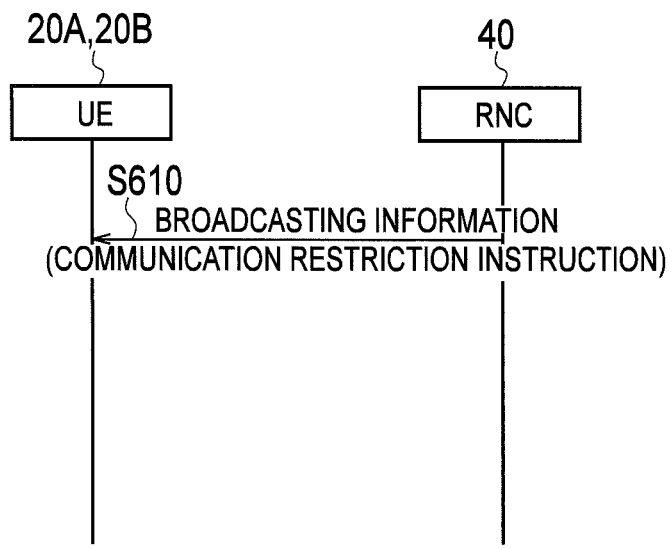
(b)
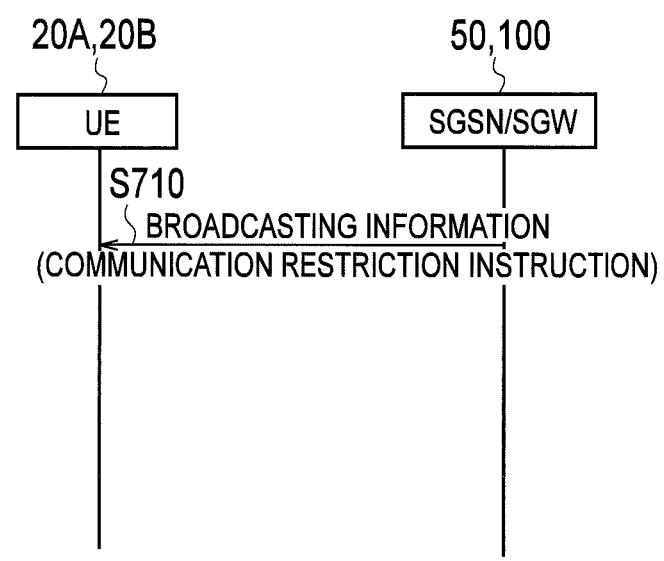

| APPLICATION A | UNDER RESTRICTION |
|---|---|
| APPLICATION B | UNDER RESTRICTION |
| APPLICATION C | UNDER RESTRICTION |
| APPLICATION D | UNDER RESTRICTION |
| APPLICATION E | UNDER RESTRICTION |
| APPLICATION F | UNDER RESTRICTION |

(b)

| APPLICATION A | 5% BARRING |
|---|---|
| APPLICATION B | 10% BARRING |
| APPLICATION C | 80% BARRING |
| APPLICATION D | 25% BARRING |
| APPLICATION E | 50% BARRING |
| APPLICATION F | 25% BARRING |

| APPLICATION G | EXEMPTED FROM RESTRICTION |
|---|---|
| APPLICATION H | EXEMPTED FROM RESTRICTION |

(b)

| APPLICATIONS OTHER THAN G, H | 80% BARRING |
|---|---|

| APPLICATION A | UNDER RESTRICTION |
|---|---|
| APPLICATION B | UNDER RESTRICTION |
| APPLICATION C | EXEMPTED FROM RESTRICTION |
| APPLICATION D | UNDER RESTRICTION |
| APPLICATION E | EXEMPTED FROM RESTRICTION |
| APPLICATION F | UNDER RESTRICTION |

(b)

| APPLICATION A | 5% BARRING |
|---|---|
| APPLICATION B | 10% BARRING |
| APPLICATION D | 80% BARRING |
| APPLICATION F | 25% BARRING |

| APPLICATION A | 5% BARRING |
|---|---|
| APPLICATION B | 10% BARRING |
| APPLICATION C | 80% BARRING |
| APPLICATION D | 25% BARRING |

(b) COMMUNICATION RESTRICTION START

| VOICE COMMUNICATION-BASED | UNDER RESTRICTION |
|---|---|
| ENTERTAINMENT-BASED | UNDER RESTRICTION |
| DATA COMMUNICATION-BASED | EXEMPTED FROM RESTRICTION |

(b)

| VOICE COMMUNICATION-BASED | VOICE CALL/VIDEO CALL/AUDIO CONFERENCE... |
|---|---|
| ENTERTAINMENT-BASED | GAME 1/GAME2/VIDEO TRANSMISSION/RADIO... |
| DATA COMMUNICATION-BASED | E-MAIL/SMS/WEATHER/NEWS... |

(c)

| VOICE COMMUNICATION-BASED | 50% BARRIN |
|---|---|
| ENTERTAINMENT-BASED | 100% BARRIN |

MOBILE COMMUNICATION SYSTEM, NETWORK APPARATUS, MOBILE STATION, AND MOBILE COMMUNICATION METHOD

TECHNICAL FIELD

The present invention relates to a mobile communication system, a network apparatus, a mobile station and a mobile communication method which are capable of barring predetermined communications during state of disaster emergency or the like.

BACKGROUND ART

In recent years, in a mobile communication system, there has been a remarkable rise of smartphones with which conventional mobile phone terminals (mobile stations) are being replaced. The smartphone is accepted as a device that is usable on a mobile communication network, and that has connectivity to the Internet in addition to the functions (telephone service, short message service, and a camera and the like) provided by a conventional mobile phone terminal, and enables a user to optionally download and use an unlimited number of applications.

Applications installed in such smartphones transmit and receive data, when necessary, to and from the core network constituting a mobile communication system. For this reason, nowadays, a problem has been pointed out in that these applications cause an increase in traffic and congestion in the mobile communication system.

As a technique of avoiding such congestion by a network (carrier) side, "access control" has been known. For example, in 3G specified in 3rd Generation Partnership Project (3GPP), Access Class Barring which restricts all types of communications without limiting barring on specific types of communications, and Domain Specific Access Control (DSAC) which restricts communications via specific communication domains (circuit switched domain, for example) are provided (See Non-Patent Document 1, for example). In addition, in Long Term Evolution (LTE), Access Class Barring and Service Specific Access Control (SSAC) which restricts specific services (voice calls or video phones, for example) are provided.

PRIOR ART DOCUMENT

Non-Patent Document

Non-Patent Document 1: 3GPP TS22.011 3rd Generation Partnership Project; Technical Specification Group Services and System Aspects; Service accessibility (Release 11) Subclause 4: Access control, 3GPP, December 2011

SUMMARY OF THE INVENTION

As described above, smartphones enable users to download an unlimited number of applications optionally. Since these applications perform communications individually, the communications in a radio section and a core network increase and the communications cannot be controlled on the initiative of the network. Hence, application-based access restriction is required. There is a problem, however, that the above-mentioned conventional access control (Access Class Barring, DSAC, SSAC) does not enable the network side to take initiative to restrict or permit communications of only a specific application. Such a problem is mainly attributable to the fact that control operation necessary for the conventional access restriction is implemented in a lower layer (RRC layer), and there is technical and design-conceptual difficulty in enabling judgment of an application type in this layer.

This is an obstacle to implement operation that permits applications for a message board and message service for safety confirmation used during states of disaster emergency (such as an earthquake), while barring the other applications.

Hence, the present invention has been made in light of these circumstances, and has an objective to provide a mobile communication system, a network apparatus, a mobile station, and a mobile communication method by which among applications installed in a mobile station such as a smartphone, a network operator is enabled to control applications for which communications are to be barred or permitted during state of disaster emergency or the like.

A first feature of the present invention is summarized as a mobile communication system, including: a mobile station which is configured to implement radio communications with a radio base station and in which multiple applications are installed; and a network apparatus configured to control communications by the mobile station via the radio base station. Here, the network apparatus comprises a restriction instruction transmission unit configured to transmit the mobile station a communication restriction instruction to control communications of an application to be restricted or permitted among the multiple applications, the mobile station includes: an application control information holding unit configured to hold application control information at least including identification information of an application to be restricted or permitted to perform communications among the multiple applications; a restriction instruction reception unit configured to receive the communication restriction instruction from the network apparatus via the radio base station; and a restriction instruction notification unit configured to notify an upper layer, which is configured to implement communications with the application, of reception of the communication restriction instruction based on the communication restriction instruction received by the restriction instruction reception unit.

A second feature of the present invention is summarized as a network apparatus which controls, via a radio base station, communications by a mobile station in which multiple applications are installed. Here, the mobile station is configured to bar communications by an application to be restricted to perform communications among the multiple applications, based on notification of reception of a communication restriction instruction to control communications of an application to be restricted or permitted, and application control information at least including identification information of the application to be restricted or permitted to perform communications among the multiple applications, and the network apparatus comprises a restriction instruction transmission unit configured to transmit the communication restriction instruction to the mobile station.

A third feature of the present invention is summarized as a mobile station which implements radio communications with a radio base station and in which multiple applications are installed, the mobile station including: an application control information holding unit configured to hold application control information at least including identification information of an application to be restricted or permitted to perform communications among the multiple applications; a restriction instruction reception unit configured to receive from a network apparatus via the radio base station a communication restriction instruction to control communications of an application to restrict or permit among the multiple applications; and a restriction instruction notification unit configured to notify an upper layer, which is configured to implement communications with the application, of reception of the communication restriction instruction based on the communication restriction instruction received by the restriction instruction reception unit.

A fourth feature of the present invention is summarized as a mobile communication method using: a mobile station which is configured to implement radio communications with a radio base station and in which multiple applications are installed; and a network apparatus configured to control communications by the mobile station via the radio base station, the mobile communication method comprising the steps of: causing the network apparatus to transmit the mobile station a communication restriction instruction to control communications of an application to be restricted or permitted among the multiple applications; causing the mobile station to receive the communication restriction instruction from the network apparatus via the radio base station; and causing the mobile station to notify an upper layer, which is configured to implement communications with the application, of reception of the communication restriction instruction based on the received communication restriction instruction.

BRIEF DESCRIPTION OF THE DRAWINGS

FIG. 4 is a functional block configuration diagram of an SGSN 50 and an SGW 100 according to an embodiment of the present invention.

FIG. 8 is a view showing communication sequence according to example 3 of operation to acquire application control information according to an embodiment of the present invention.

FIG. 11 is a view showing overall communication sequence when communication restriction according to an embodiment of the present invention is implemented.

FIG. 14 is a view showing a configuration example 1 of application control information and a communication restriction instruction according to an embodiment of the present invention.

FIG. 15 is a view showing a configuration example 2 of application control information and a communication restriction instruction according to an embodiment of the present invention.

FIG. 16 is a view showing a configuration example 3 of application control information and a communication restriction instruction according to an embodiment of the present invention.

FIG. 17 is a view showing a configuration example 4 of application control information and a communication restriction instruction according to an embodiment of the present invention.

FIG. 18 is a view showing a configuration example 5 of application control information and a communication restriction instruction according to an embodiment of the present invention.

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of a Mobile Communication System

Figure 1:
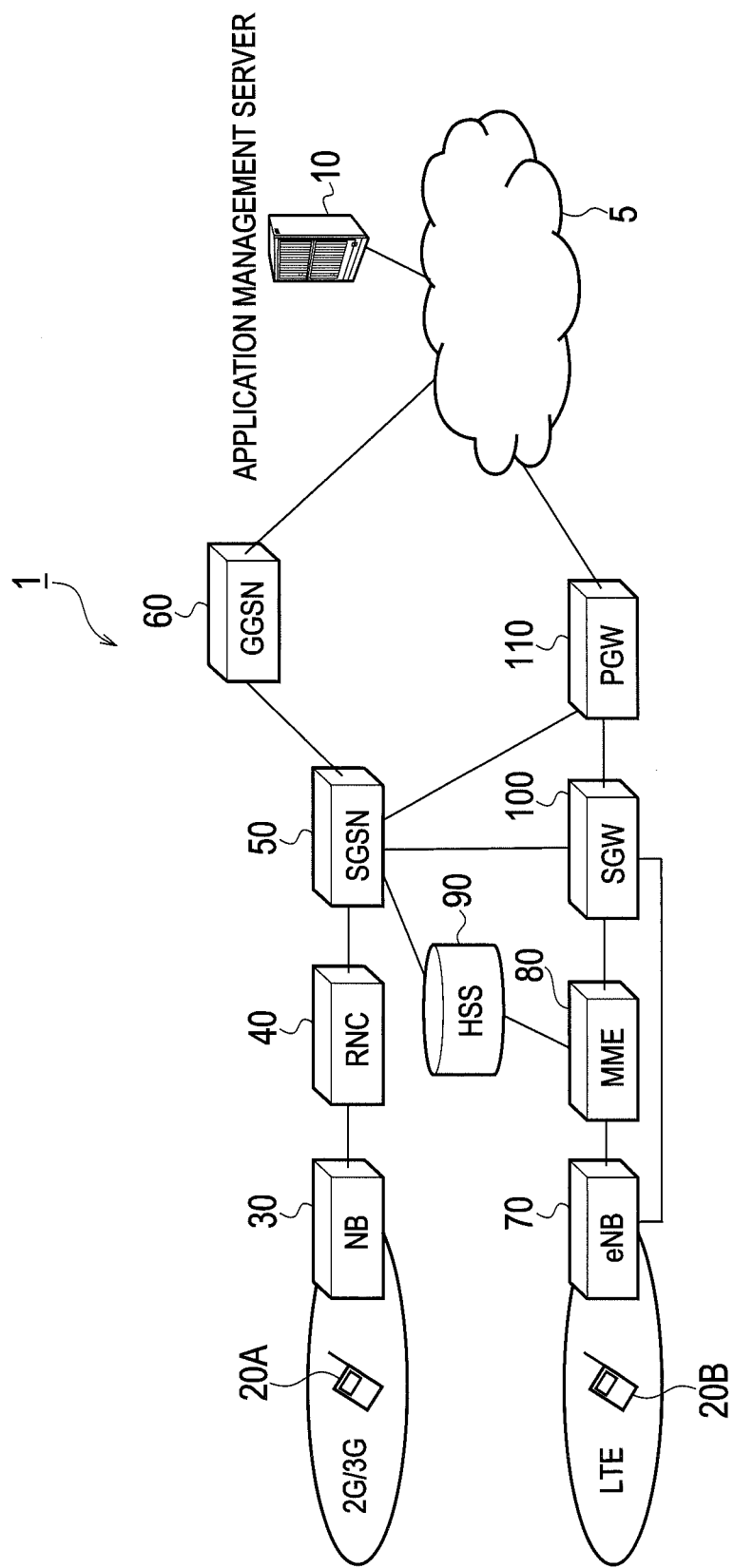
FIG. 1 is an overall schematic configuration diagram of a mobile communication system 1 according to an embodiment of the present invention.

FIG. 1 is an overall schematic configuration diagram of a mobile communication system 1 according to this embodiment. As shown in FIG. 1, the mobile communication system 1 includes mobile stations 20A, 20B (hereinafter referred to as UE 20A, 20B), a radio base station 30 (hereinafter NB 30), a radio base station 70 (hereinafter eNB 70), and a network apparatus to be connected to the NB 30 or the eNB 70. The mobile communication system 1 includes multiple radio access networks, specifically, 3G (W-CDMA) specified in the 3GPP and the Long Term Evolution (LTE). The NB 30 is a radio base station conforming to 3G, while the eNB 70 is a radio base station conforming to LTE. The UE 20A, 20B support 3G and LTE, and can implement radio communications with the NB 30 and the eNB 70. Note that 2G (GSM (registered trademark) and the like) may be included in addition to 3G and LTE.

As shown in FIG. 1, the network apparatuses on the side of 3G which are included in the mobile communication system 1 include a Radio Network Controller 40 (hereinafter an RNC 40) which controls the UE 20A, 20B via the NB 30, a Serving GRPS Support Node 50 (hereinafter an SGSN 50) which is a control node for packet access, and a Gateway GPRS Support Node 60 (hereinafter a GGSN 60) which is a gateway node for packet access. In addition, the network apparatuses on the side of LTE which are included in the mobile communication system 1 include a Mobility Management Entity 80 (hereinafter an MME 80) which implements mobility control or bearer control of the UE 20A, 20B, a Home Subscriber Server 90 (hereinafter an HSS 90) which manages subscriber information, a Serving Gateway 100 (hereinafter an SGW 100) which is a packet switch in a service area which accommodates an LTE access system, and a Packet Data Network Gateway 100 (hereinafter a PGW 110) which is a packet switch that assigns an IP address or transfers a packet to the SGW, and the like. In addition, it should be noted that a network apparatus constituting the mobile communication system 1 is not limited to the apparatuses shown in FIG. 1. In addition, these network apparatuses control communications by the UE 20A, 20B via the radio base stations (NB 30, eNB 70) and constitute the core network in the mobile communication system 1.

The mobile communication system 1 is connected to an IP network 5 via the above-mentioned network apparatuses. The IP network 5 is a communication network based on an Internet protocol and includes an Internet or a Local Area Network which does not connect to the Internet, and the like. An application management server 10 is connected to the IP network 5. If a predetermined condition is met (under state of disaster emergency such as an earthquake, for example), the application management server 10 manages information such as one indicating whether or not to restrict (or permit) communications by the application. The application management server 10 may also manage information on an application installed in the UE 20A, 20B.

(2) Functional Block Configuration of the Mobile Communication System

A functional block configuration of the mobile communication system 1 is described hereinafter. Specifically, a functional block configuration of the application management server 10, the RNC 40, the SGSN 50/SGW 100 and the UE 20A (20B) is described.

(2.1) Application Management Server 10

Figure 2:
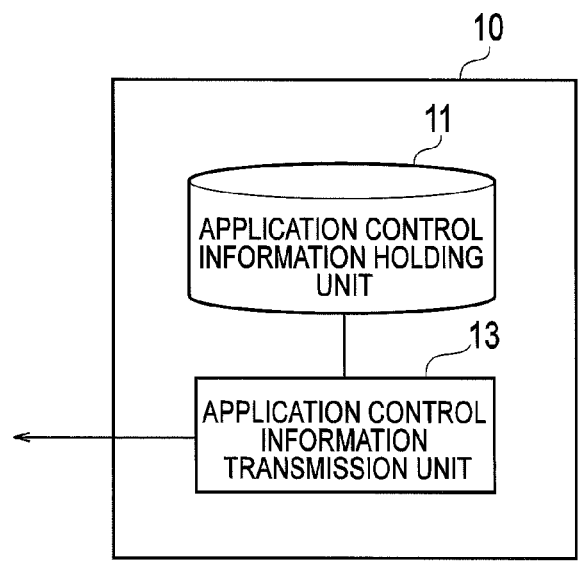
FIG. 2 is a functional block configuration diagram of an application management server 10 according to an embodiment of the present invention.

FIG. 2 is a functional block configuration diagram of the application management server 10. As shown in FIG. 2, the application management server 10 includes an application control information holding unit 11 and an application control information transmission unit 13.

The application control information holding unit 11 holds application control information containing an application under communication restriction among multiple applications installable in the UE 20A, UE 20B. Specifically, the application control information holding unit 11 holds the application control information including identification information (name or identifier, for example) of the application of restriction target. The application control information is usually set by a carrier which provides the mobile communication system 1. Note that the application control information can be added/deleted/modified by the carrier at any timing.

In addition, the application control information may further include an application barring rate to be applied under communication restriction. For example, if the barring rate is 20%, the application is restricted to perform communications at a rate of once per five communication requests. The application barring rate may be set to be static and unchangeable, or to be dynamically changeable at any timing. Note that the application control information may be formed by containing applications given communication permissions, in place of applications under communication restriction. Alternatively, the application control information may mixedly include applications under communication restriction and applications under communication permission. In this case, the application control information includes information indicating whether to restrict or permit the application to perform communications. In addition, a configuration example of the application control information is described below.

The application control information transmission unit 13 transmits the application control information held by the application control information holding unit 11 to the UE 20A, 20B via the IP network 5. The application control information transmission unit 13 may transmit the application control information to the UE 20A, 20B via the core network constituting the mobile communication system 1 and a radio access network (3G or LTE), or may transmit the application control information to the UE 20A, 20B via a radio LAN and the like. In addition, the application control information transmission unit 13 may transmit the application control information at every predetermined interval (one week, for example) or may transmit the application control information as per a request from the UE 20A, 20B. Furthermore, the application control information transmission unit 13 may transmit the application control information when the application control information is changed (change of the barring rate and the like).

(2.2) RNC 40

Figure 3:
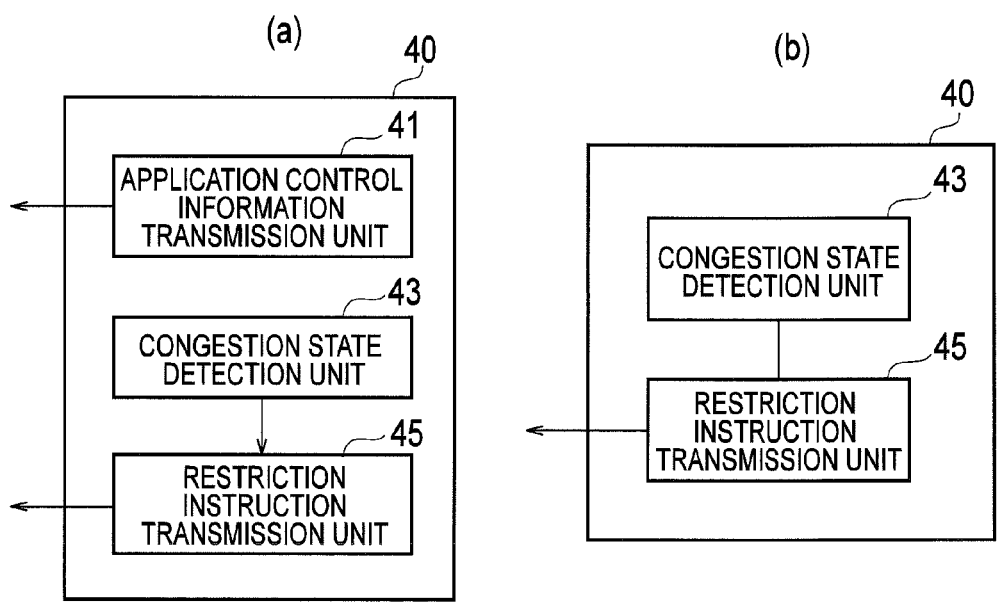
FIG. 3 is a functional block configuration diagram of an RNC 40 according to an embodiment of the present invention.

FIG. 3 is a functional block configuration diagram of the RNC 40. As shown in FIG. 3(*a*), the RNC 40 includes an application control information transmission unit 41, a congestion state detection unit 43, and a restriction instruction transmission unit 45. As another mode, as shown in FIG. 3(*b*), the RNC 40 may include only the congestion state detection unit 43 and the restriction instruction transmission unit 45.

The application control information transmission unit 41 transmits application control information to the UE 20A, UE 20B. Specifically, the application control information transmission unit 41 holds application control information which is similar to the application control information held by the above-mentioned application management server 10. In addition, the application control information transmission unit 41 holds application control information transmitted from the application management server 10, and may transmit the held application control information to the UE 20A, 20B or may transmit the UE 20A, 20B application control information which is directly uploaded to the RNC 40.

The congestion state detection unit 43 detects a congestion state of the mobile communication system 1. The congestion state detection unit 43 may detect a congestion state of the mobile communication system 1 only by the RNC 40 based on a traffic amount in the mobile communication system 1 or may detect a congestion state of the mobile communication system 1 based on information notified from other apparatus, such as an operation maintenance system (OPS) or the SGSN 50, for example.

The restriction instruction transmission unit 45 transmits a communication restriction instruction to the UE 20A, 20B. Specifically, when the congestion state detection unit 43 detects a congestion state of the mobile communication system 1, the restriction instruction transmission unit 45 transmits a communication restriction instruction to the UE 20A, 20B. The communication restriction instruction includes information for controlling communications of an application to be restricted or permitted among multiple applications installable in the UE 20A, 20B. Specifically, as described below, the communication restriction instruction may include identification information of an application to be restricted or permitted to perform communications, or only information which indicates issuance of restriction. In addition, the communication restriction instruction may include a barring rate for an application under restriction or the same barring rate to be applied to all applications.

(2.3) SGSN 50/SGW 100

FIG. 4 (*a*) is a functional block configuration diagram of the SGSN 50. FIG. 4(*b*) is a functional block configuration diagram of the SGW 100. As shown in FIG. 4(*a*), the SGSN 50 includes a congestion state detection unit 51 and a restriction instruction transmission unit 53. In addition, as shown in FIG. 4 (*b*), the SGW 100 includes a congestion state detection unit 101 and a restriction instruction transmission unit 103.

The congestion state detection unit 51 of the SGSN 50 and the congestion state detection unit 101 of the SGW 100 have functions almost similar to the congestion state detection unit 43 of the RNC 40 mentioned above. In addition, the restriction instruction transmission unit 53 of the SGSN 50 and the restriction instruction transmission unit 103 of the SGW 100 have functions almost similar to the restriction instruction transmission unit 45 of the RNC 40. Specifically, at least any of the RNC 40, the SGSN 50 or the SGW 100 can transmit a communication restriction instruction to the UE 20A, 20B.

(2.4) UE 20A (20B)

Figure 5:
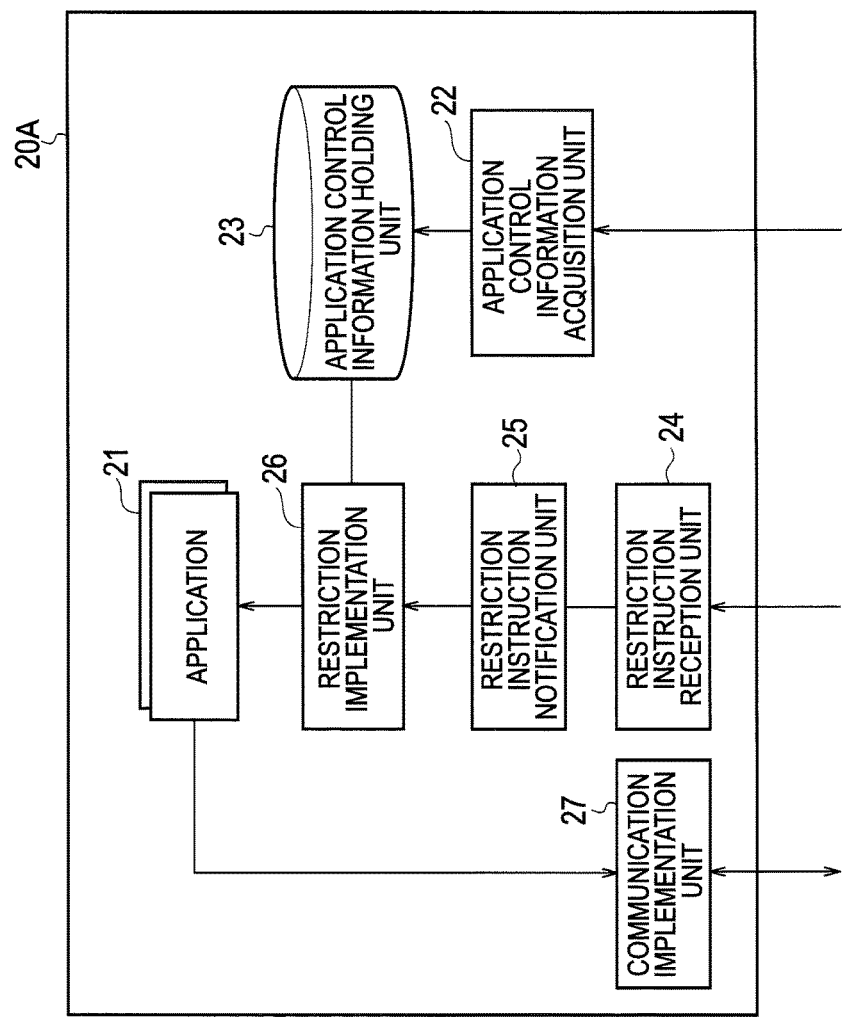
FIG. 5 is a functional block configuration diagram of a UE 20A according to an embodiment of the present invention.

FIG. 5 is a functional block configuration diagram of the UE 20A. Note that the UE 20B has a functional block configuration similar to the UE 20A. As shown in FIG. 5, the UE 20A includes applications 21, an application control information acquisition unit 22, an application control information holding unit 23, a restriction instruction reception unit 24, a restriction instruction notification unit 25, a restriction implementation unit 26, and a communication implementation unit 27.

The UE 20A is what is termed as a smartphone and enables a user of the UE 20A to download and use numerous applications 21 optionally. The applications 21 include all applications, which users can download from predetermined sites and which can run on a platform of the UE 20A, such for example as voice communication-based (voice calls, video calls, and the like), entertainment-based (games, video transmission and the like) and data communication-based (e-mail, short message service (SMS), and the like) applications.

The application control information acquisition unit 22 acquires application control information. Specifically, the application control information acquisition unit 22 acquires application control information transmitted from the application management server 10 via a radio access network (radio base station) or other network such as a radio LAN and the like. Alternatively, the application control information acquisition unit 22 can acquire application control information via a communication interface such as an USB which the UE 20A is provided with.

The application control information holding unit 23 holds application control information acquired by the application control information acquisition unit 22. Alternatively, the application control information holding unit 23 may hold application control information which is written from the outside when the UE 20A is manufactured or sold.

The restriction instruction reception unit 24 receives a communication restriction instruction from a network apparatus via a radio base station. Specifically, the restriction instruction reception unit 24 receives a communication restriction instruction from any network apparatus of the RNC 40, the SGSN 50 or the SGW 100 via the NB 30 or the eNB 70. As described above, the communication restriction instruction includes identification information of an application to be restricted or permitted to perform communications. The communication restriction instruction may be transmitted as a message in a Non-Access Stratum (NAS) protocol or a message in an IP layer, or may be transmitted as a message in an Access Stratum (AS) protocol.

In addition, the restriction instruction reception unit may receive an instruction related to other existing communication restrictions (Access Class Barring, DSAC and SSAC).

The restriction instruction notification unit 25 notifies an upper layer, which is configured to implement communications with an application, of reception of a communication restriction instruction based on a communication restriction instruction received by the restriction instruction reception unit 24. Specifically, the restriction instruction notification unit 25 notifies an operating system (kernel and the like) which implements communications with an application installed in the UE 20A of reception of a communication restriction instruction. Note that the operating system controls basic operations of the UE 20A and includes Android or iOS, for example.

In addition, the restriction instruction notification unit 25 can notify the upper layer of priority of the UE 20A relative to other mobile stations. Specifically, the restriction instruction notification unit 25 notifies the upper layer of an access class (priority/general level) of the UE 20A stipulated by the 3GPP (TS22.011, for example) together with reception of the communication restriction instruction.

The restriction implementation unit 26 bars communications by an application under communication restriction based on the notification that the communication restriction instruction has been received from the restriction instruction notification unit 25 and the application control information acquired by the application control information acquisition unit 22. Note that "bars communications by an application" means to restrict communications requested after communication restriction is issued, and communications being implemented when the communication restriction is issued may not necessarily be stopped.

Positioned between the upper layer, specifically, the application 21, and the operating system, the restriction implementation unit 26 permits only communications of the application 21 given communication permission according to the application control information and restricts (bars) communications by the other applications 21. Specifically, the restriction implementation unit 26 provides a function similar to a firewall that allows only communications of permitted applications 21.

The restriction implementation unit 26 may be installed in the UE 20A as an application. In this case, application control information may be acquired or updated when the application 21 is downloaded or updated. Alternatively, the restriction implementation unit 26 may be implemented as apart of the operating system (OS). In this case, application control information may also be acquired or updated when the OS is updated.

In addition, the restriction implementation unit 26 can judge whether or not the communication implementation unit 27 configured to implement radio communications is in an idle state where the communication implementation unit 27 does not hold a communication channel in a radio layer (RRC layer, for example). If the communication implementation unit 27 is in the idle state, the restriction implementation unit 26 can bar communications of an application under communication restriction. In addition, if a predetermined condition is met, the restriction implementation unit 26 can bar communications of the application under communication restriction, even if the communication implementation unit 27 is in an active state where the communication implementation unit 27 holds the communication channel. Note that the predetermined condition is considered when a congestion state of the mobile communication system 1 becomes particularly high, and the like.

(3) Operation of the Mobile Communication System

Operation of the above-mentioned mobile communication system 1 is described hereinafter. Specifically, operation to acquire application control information and operation to implement communication restriction are described. In addition, examples of application control information and a communication restriction instruction are also described.

(3.1) Acquisition of Application Control Information

FIG. 6 to FIG. 10 show communication sequence according to examples 1 to 5 of the operation to acquire application control information.

(3.1.1) Operation Example 1

Figure 6:
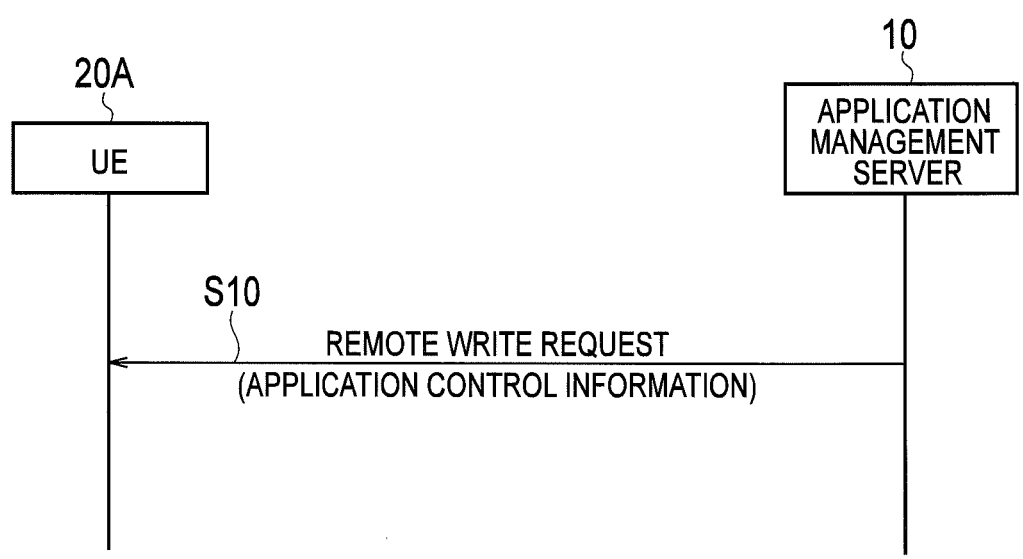
FIG. 6 is a view showing communication sequence according to example 1 of operation to acquire application control information according to an embodiment of the present invention.

In an operation example 1, the UE 20A acquires application control information using a user plane (U-Plane). As shown in FIG. 6, the UE 20A receives application control information included in a remote write request on the U-Plane from the application management server 10 (S10). The UE 20A holds (stores) the received application control information.

Specifically, in a state where the UE 20A attaches to a radio access network using IP Connectivity (U-Plane/Bearer), the application management server 10 remotely writes the application control information. OMA DM, OMA PUSH, SMS PUSH, IP Push, OTA, XCAP, or HTTP and the like may be used in such remote writing of the application control information. In addition, the usable data format may be XML, HTML or the like, but also may be a text format.

(3.1.2) Operation Example 2

Figure 7:
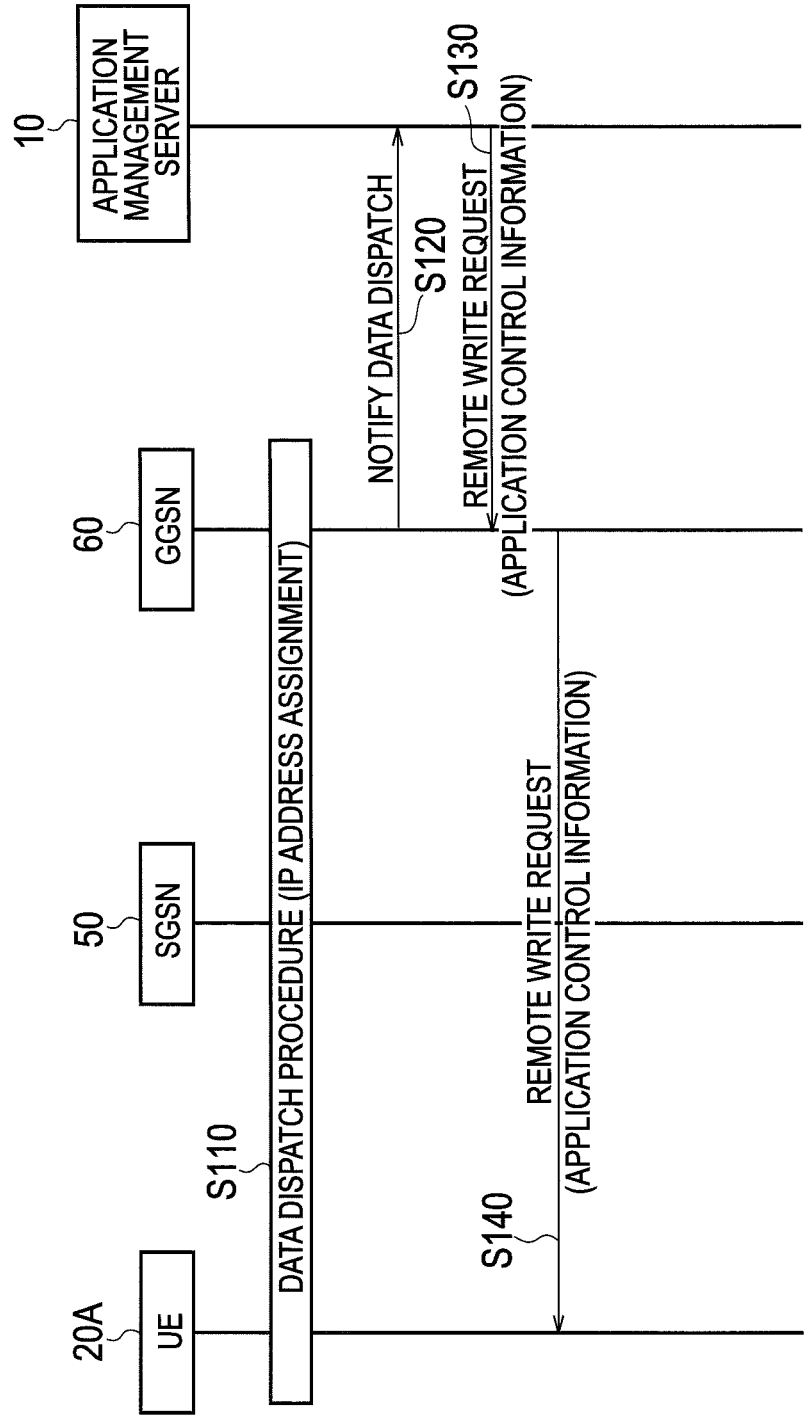
FIG. 7 is a view showing communication sequence according to example 2 of operation to acquire application control information according to an embodiment of the present invention.

In an operation example 2, the UE 20A acquires application control information using IP control information. As shown in FIG. 7, the UE 20A performs a data dispatch procedure with the GGSN 60 (S110). A data dispatch procedure may include IP control information using IP address config., such as Router Advertisement, DHCP, ICMP and the like, and assignment of an IP address to the UE 20A or the like is implemented. A radio access network on which the UE 20A camps controls such IP control information, and enables the IP control information to be set uniquely to a user (UE).

The GGSN 60 notifies the application management server 10 of the data dispatch from the UE 20A (S120). Based on the notification, the application management server 10 remotely writes the application control information (S130, S140). Specifically, when the UE 20A attaches to the radio access network, an IP layer signal including the application control information is transmitted to the UE 20A from the GGSN 60 (or this may be the SGW 100).

Note that in the operation example 1 and the operation example 2, content of the application control information may be changed depending on a roaming destination, inconsideration of a Roaming agreement among carriers. In addition, the GGSN 60 may be provided with the functions of the application management server 10.

(3.1.3) Operation Example 3

In an operation example 3, the UE 20A acquires application control information included in broadcasting information. As shown in FIG. 8(a), the UE 20A (20B) receives the broadcasting information including the application control information from the RNC 40 (S210). The broadcasting information includes usage of a broadcast channel (BCCH) or CBS (Cell Broadcast Service). In the case of the CBS, as shown in FIG. 8(b), the application control information is included in a Broadcast request transmitted from the application management server 10, specifically, CBC (Cell Broadcast Center) including the application management server 10, and the RNC 40 transmits a Cell Broadcast including the application control information.

Since the broadcasting information is transmitted to multiple mobile stations, unlike the IP control information (operation example 2) described above, no individual setting for the user (UE) is possible. Note that the application control information included in the broadcasting information may be changed by the area, or may be made identical within a radio access network.

(3.1.4) Operation Example 4

Figure 9:
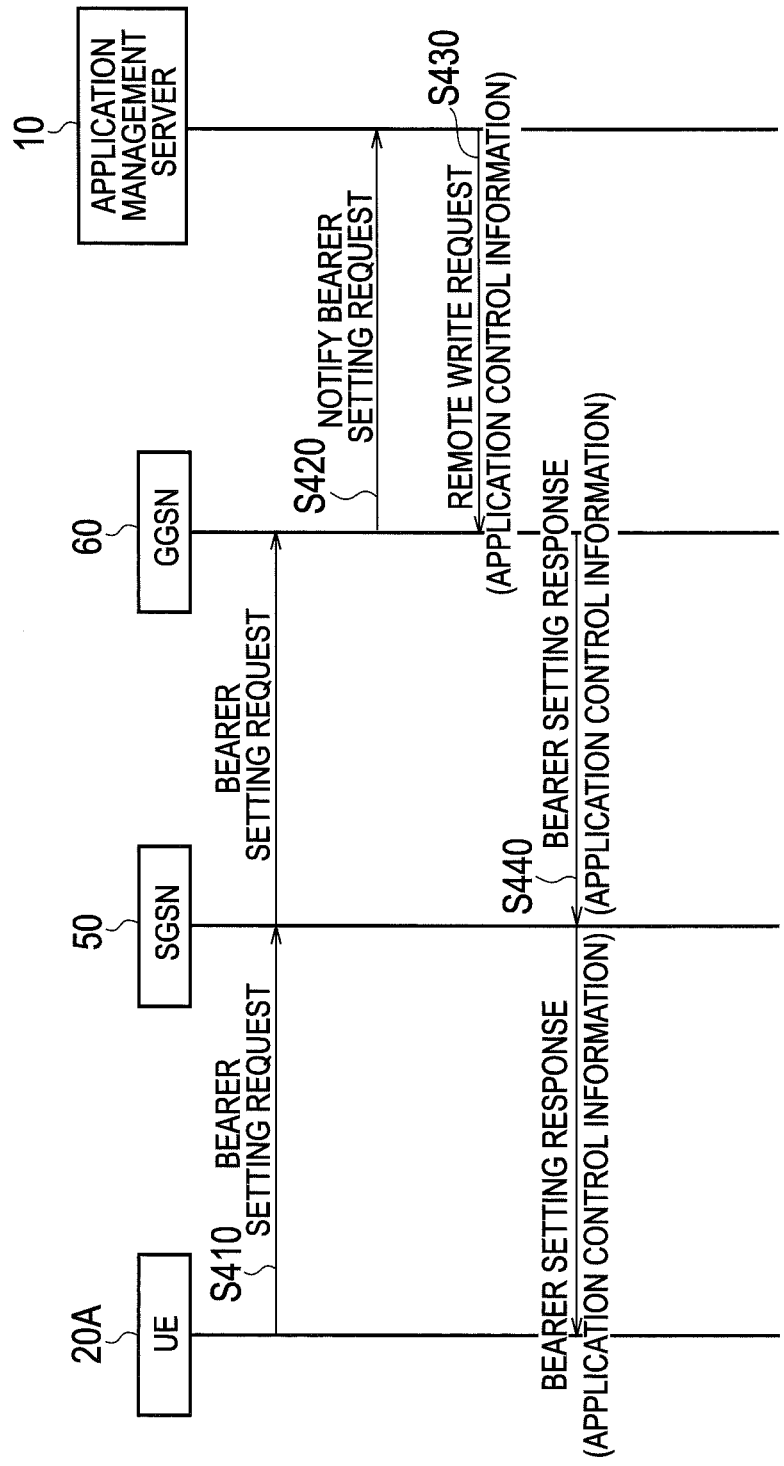
FIG. 9 is a view showing communication sequence according to example 4 of operation to acquire application control information according to an embodiment of the present invention.

In an operation example 4, the UE 20A acquires application control information using a control plane (C-Plane). Specifically, location registration implemented by the UE 20A is used. As shown in FIG. 9, the UE 20A transmits a bearer setting request to the GGSN 60 (S410). The GGSN 60 notifies the application management server 10 of the bearer setting request of the UE 20A (S420). Based on the notification, the application management server 10 remotely writes the application control information (S430). The GGSN 60 which has received the remote write request transmits a bearer setting response including the application control information to the UE 20A (S440).

In this operation example, a dispatch system NAS signal or a PCO (Protocol Configuration Option) can be used, and is controlled by a radio access network on which the UE 20A camps and a home network of the UE 20 to be set uniquely to the user (UE).

(3.1.5) Operation Example 5

Figure 10:
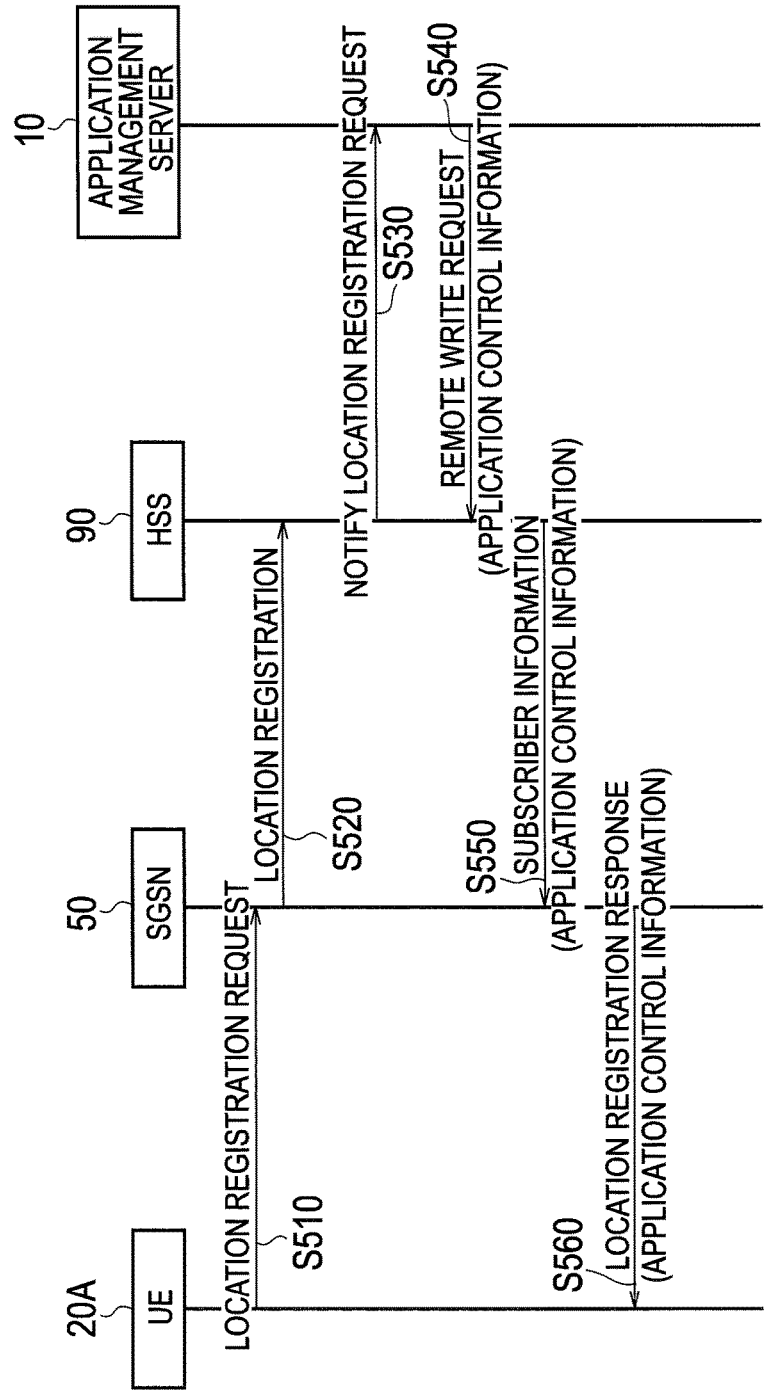
FIG. 10 is a view showing communication sequence according to example 5 of operation to acquire application control information according to an embodiment of the present invention.

In an operation example 5, the UE 20A acquires application control information using the C-Plane (location registration), similar to the operation example 4. Specifically, as shown in FIG. 10, the UE 20A transmits a location registration request to the SGSN 50 (S510). The SGSN 50 implements a location registration process with the HSS 90 based on the location registration request received from the UE 20A (S520). The HSS 90 notifies the application management server 10 of the location registration request of the UE 20A (S530). Based on the notification, the application management server 10 remotely writes the application control information (S540). The HSS 90 which has received a remote write request causes the SGSN 50 to download subscriber information including the application control information (S550). Based on the downloaded subscriber information for the UE 20A, the SGSN 50 transmits a location registration response including the application control information to the UE 20A (S560).

In this operation example, the NAS (MM/GMM/EMM location registration) signal can be used, and the radio access network on which the UE 20A camps and the home network of the UE 20A control the signal to enable the signal to be set uniquely to the user (UE). In addition, the HSS 90 may hold the application control information as a part of the subscriber information. In addition, the application management server 10 may transmit a remote write request to the SGSN 50, and not to the HSS 90.

(3.1.6) Others

A method for the UE 20A to hold application control information may be a method to be described below, in addition to the operation examples 1 to 5 described above. For example, the application control information may be written in advance in Subscriber Identity Module (SIM) of the UE 20A or a non-volatile memory of the UE 20A. In addition, a user of the UE 20A may be allowed to select an application under communication restriction (or given communication permission) of communications. In this case, from a standpoint of avoiding congestion in the mobile communication system 1, it is preferable to set an upper limit for the number of the applications (for example, one) given communication permission. In addition, the user may be allowed to specify the application through a website provided by a carrier, and the like.

(3.2) Implementation of Communication Restriction

Figure 12:
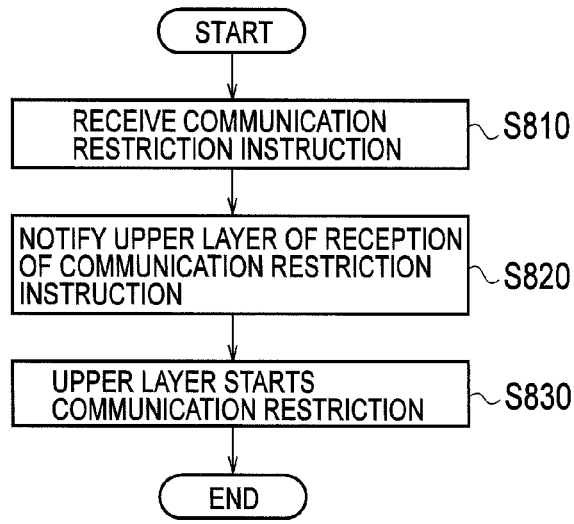
FIG. 12 is a view showing an operation flow in which a UE 20 according to an embodiment of the present invention starts communication restriction based on a communication restriction instruction.
Figure 13:
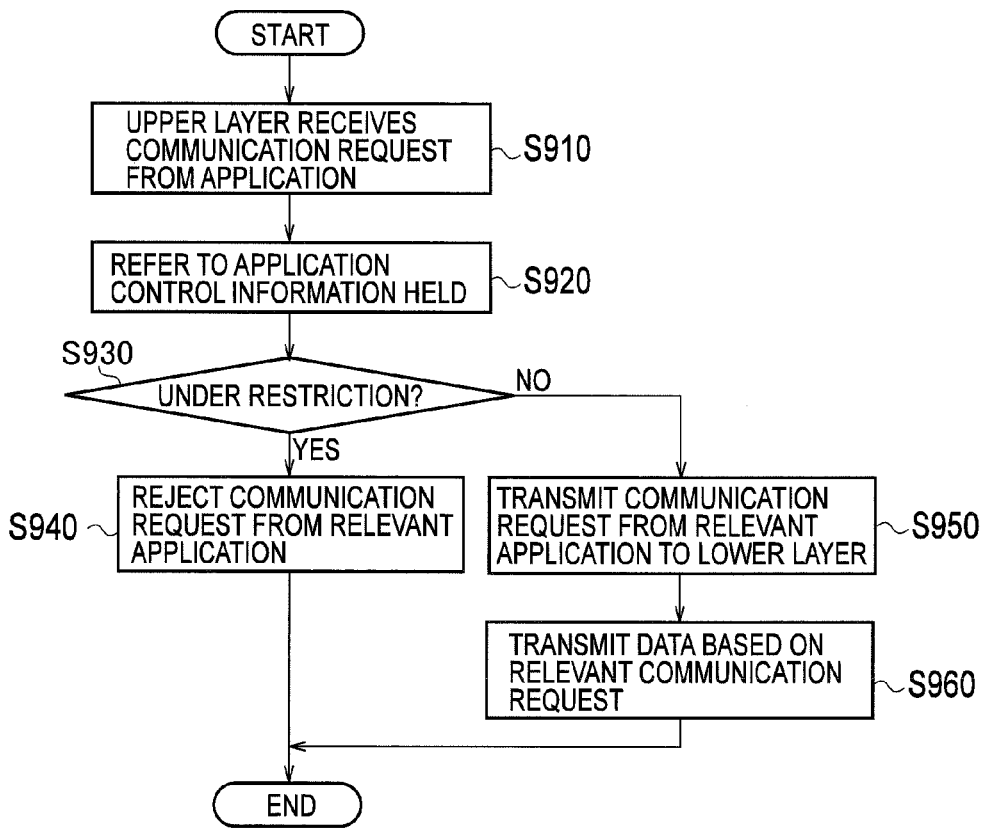
FIG. 13 is a view showing an operation flow in which the UE 20A according to an embodiment of the present invention restricts communications of an application under communication restriction.

FIG. 11(a) and FIG. 11(b) show overall communication sequence when communication restriction is implemented. In addition, FIG. 12 and FIG. 13 show an operation flow of the UE 20A when the communication restriction is implemented.

(3.2.1) Overall Communication Sequence

As shown in FIG. 11(a), when it is determined that communication restriction is required due to congestion in the mobile communication system 1 and the like, the RNC 40 transmits broadcasting information including a communication restriction instruction to the UE 20A, 20B (S610). A message of the RRC layer can be used as the broadcasting information.

In addition, as shown in FIG. 11(b), the SGSN 50 or the SGW 100 may transmit the broadcasting information (S710). In this case, a message of the IP layer can be used as the broadcasting information.

(3.2.2) Operation Flow of the UE 20A

FIG. 12 shows an operation flow for the UE 20A to start communication restriction based on a communication restriction instruction. In addition, FIG. 13 shows an operation flow for the UE 20A to restrict communications of an application under the communication restriction.

As shown in FIG. 12, the UE 20A receives a communication restriction instruction from the RNC 40 (or the SGSN 50/SGW 100) (S810). When receiving the communication restriction instruction, the UE 20A notifies the upper layer of reception of the communication restriction instruction (S820).

Based on the notification, the upper layer starts communication restriction of a target application (S830).

Then, as shown in FIG. 13, when the upper layer (restriction implementation unit 26, see FIG. 5) receives a communication request (S910) from an application 21, which is any of the multiple applications 21 installed in the UE 20A, the upper layer refers to application control information which the upper layer holds (S920).

The upper layer judges whether or not the application 21 which transmits the communication request is under the communication restriction (S930). If the application 21 is under the communication restriction, the upper layer rejects the communication request from the application 21 (S940). On the one hand, if the application 21 is exempted from the communication restriction, the upper layer transmits the communication request from the application 21 to a lower layer, specifically, the IP layer and a radio communication layer (such as the RRC layer) (S950).

The lower layer transmits data based on the communication request to the radio base station (NB 30 or eNB 70) at a connection destination (S960).

(3.3) Configuration Examples of Application Control Information and a Communication Restriction Instruction With reference to FIG. 14 to FIG. 18, configuration examples of application control information and a communication restriction instruction are described hereinafter.

(3.3.1) Configuration Example 1

FIG. 14(a) and FIG. 14(b) show configuration examples 1 of application control information and a communication restriction instruction. Specifically, FIG. 14(a) shows a configuration example 1 of application control information, and FIG. 14(b) shows a configuration example 1 of a communication restriction instruction.

As shown in FIG. 14(a) and FIG. 14(b), the application control information according to this configuration example contains identification information of an application (application A to F) and information indicating whether or not to restrict an application to perform communications. In addition, the communication restriction instruction according to this configuration example contains identification information of an application and an application barring rate.

For example, 10% barring means that communications are restricted at a rate of once per ten communication requests. Note that the barring rate may be provided for every application, as shown in FIG. 14 (b) or may be common to multiple applications. In addition, as described above, the UE 20A may notify the upper layer of information indicating priority of the communication request together with such a communication restriction instruction. Specifically, the information may be an access class (priority level) or information which can identify any of an emergency call, a general user, or a priority user.

(3.3.2) Configuration Example 2

FIG. 15(a) and FIG. 15(b) show configuration examples 2 of application control information and a communication restriction instruction. Specifically, FIG. 15(a) shows a configuration example 2 of application control information, and FIG. 15(b) shows a configuration example 2 of a communication restriction instruction.

As shown in FIG. 15(a) and FIG. 15(b), the application control information according to this configuration example contains identification information of an application exempted from restriction, and information indicating that the application is exempted from restriction. In addition, the communication restriction instruction according to this configuration example contains information which excludes any application exempted from restriction and the application barring rate.

With such communication restriction instruction, 80% of communications by applications other than the applications G, H is restricted. In addition, such a configuration is useful when the number of applications under restriction is large and can reduce data size of the application control information and the communication restriction instruction.

(3.3.3) Configuration Example 3

FIG. 16(a) and FIG. 16(b) show configuration examples 3 of application control information and a communication restriction instruction. Specifically, FIG. 16(a) shows a configuration example 3 of the application control information and FIG. 16 (b) is a configuration example 3 of the communication restriction instruction.

As shown in FIG. 16(a) and FIG. 16(b), the application control information according to this configuration example contains identification information of an application (applications A to F) and information indicating whether or not an application is under communication restriction. In this configuration example, applications under restriction and applications exempted from restriction are mixed. In addition, the communication restriction instruction according to this configuration example contains identification information of an application under restriction (A, B, D, F) and a barring rate of the application. As such, the application under restriction and the application exempted from restriction may be mixed in the application control information. With such a configuration example, it is possible to specify in detail whether or not there is communication restriction for every application.

(3.3.4) Configuration Example 4

FIG. 17(a) and FIG. 17(b) show configuration examples 4 of application control information and a communication restriction instruction. Specifically, FIG. 17(a) shows a configuration example 4 of the application control information, and FIG. 17(b) shows a configuration example 4 of the communication restriction instruction.

As shown in FIG. 17(a) and FIG. 17(b), the application control information according to the configuration example contains identification information of an application (applications A to D) and information indicating whether or not an application is under communication restriction. In addition, the communication restriction instruction according to this configuration example contains only information indicating start of the communication restriction. With such a configuration example, since an amount of data when the communication restriction starts can be suppressed, the communication restriction may be started promptly and reliably.

(3.3.5) Configuration Example 5

FIG. 18(a) to FIG. 18(c) show configuration examples 5 of application control information and a communication restriction instruction. Specifically, FIG. 18(a) and FIG. 18(b) show a configuration example 5 of the application control information, and FIG. 18(c) shows a configuration example 5 of the communication restriction instruction.

As shown in FIG. 18(a), the application control information according to this configuration example contains an application category (voice communication-based, entertainment-based, data communication-based) and information indicating whether or not an application is under communication restriction. Furthermore, as shown in FIG. 18(b), the application control information according to this configuration example contains each category and identification information (name) of an application included in the category. In addition, the communication restriction instruction according to this configuration example contains a category of an application under restriction and a barring rate of the category.

With such a configuration example, even when a number of applications under restriction exist, an amount of data of the communication restriction instruction can be suppressed.

(4) Operation/Effect

With the mobile communication system 1, the UE 20A (20B) holds application control information including identification information of an application under communication restriction. When receiving a communication restriction instruction from the network apparatus such as the RNC 40 or the SGSN 50 and the like, the UE 20A (20B) notifies the upper layer which implements communications with the application 21 of reception of the communication restriction instruction. This enables the network to take initiative to restrict or permit communications of only a specific application.

Specifically, with the mobile communication system 1, of the applications 21 installed in the UE 20A such as a smartphone and the like, the application 21 to be restricted or permitted to perform communications under state of disaster emergency or the like can be controlled on the initiative of the network.

In this embodiment, the upper layer of the UE 20A bars communications by the application 21 under communication restriction, based on notification that the communication restriction instruction has been received and the application control information that the upper layer holds. Thus, when congestion occurs in the mobile communication system 1, an amount of traffic can be reliably suppressed and communications of an important application 21 can be secured.

In this embodiment, a communication restriction instruction including a barring rate of the application 21 is transmitted. In addition, priority (access level and the like) of the UE 20A can be notified to the upper layer of the UE 20A, together with the communication restriction instruction. Thus, communications by the application 21 can be controlled more elaborately.

In this embodiment, whether or not to bar communications by the application 21 is judged based on whether or not the communication implementation unit 27 of the UE 20A is in an idle state. In addition, when a predetermined condition is met, such as a case where a congestion state of the mobile communication system 1 becomes particularly high, communications of the application 21 under communication restriction are barred even in the active state. Thus, even when the congestion state of the mobile communication system 1 is particularly high, for example, communications of the important application 21 can be secured.

(5) Other Embodiment

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, a scope of the present invention is not limited to when disaster emergency occur, and the present invention can be applied to communication restriction in a situation where congestion of the mobile communication system 1 may occur, such as a special day (such as New Year's Day and the like), or to priority control of specified users (UE).

In addition, in the embodiment described above, although the UE 20A is provided with the application control information acquisition unit 22, the application control information acquisition unit 22 is not necessarily required. Specifically, the application control information holding unit 23 may hold application control information in advance.

As described above, the present invention naturally includes various embodiments which are not described herein. Accordingly, the technical scope of the present invention should be determined only by the matters to define the invention in the scope of claims regarded as appropriate based on the description.

The features of the present invention may also be expressed as follows. A first feature of the present invention is summarized as a mobile communication system 1 (mobile communication system), including: UE 20A/20B (mobile station) which is configured to implement radio communications with NB 30/eNB 70 (radio base station) and in which multiple applications 21 (applications) are installed; and a network apparatus (for example, RNC 40/SGSN 50) configured to control communications by the mobile station via the radio base station. Here, the network apparatus comprises a restriction instruction transmission unit (for example, restriction instruction transmission unit 45) configured to transmit the mobile station a communication restriction instruction to control communications of an application to be restricted or permitted among the multiple applications, the mobile station includes: an application control information holding unit 23 (application control information holding unit) configured to hold application control information at least including identification information of an application to be restricted or permitted to perform communications among the multiple applications; a restriction instruction reception unit 24 (restriction instruction reception unit) configured to receive the communication restriction instruction from the network apparatus via the radio base station; and a restriction instruction notification unit 25 (restriction instruction notification unit) configured to notify an upper layer, which is configured to implement communications with the application, of reception of the communication restriction instruction based on the communication restriction instruction received by the restriction instruction reception unit.

In the first feature of the present invention, the upper layer of the mobile station may include a restriction implementation unit 26 (restriction implementation unit) configured to bar communications by the application restricted to perform communications, based on notification that the communication restriction instruction has been received from the restriction instruction notification unit and the application control information held by the application control information holding unit.

In the first feature of the present invention, the mobile station may include an application control information acquisition unit 22 (application control information acquisition unit) configured to acquire identification information of the application and the application control information including any of restriction or permission of communications.

In the first feature of the present invention, the application control information acquisition unit may acquire the application control information further including a barring rate of the application.

In the first feature of the present invention, the application control information acquisition unit may acquire the application control information via the radio base station.

In the first feature of the present invention, the restriction instruction transmission unit may transmit a communication restriction instruction which at least includes any of the identification information and the barring rate of the application.

In the first feature of the present invention, the restriction instruction notification unit may notify the upper layer of priority of the mobile station relative to other mobile stations, together with reception of the communication restriction instruction.

In the first feature of the present invention, the restriction implementation unit may judge whether or not a communication implementation unit which implements radio communications is in an idle state where the communication implementation unit does not hold a communication channel in a radio layer, and may bar communications by the application to be restricted to perform communications, if the communication implementation unit is in the idle state.

In the first feature of the present invention, if a predetermined condition is met, the restriction implementation unit may bar communications by the application to be restricted to perform communications, even if the communication implementation unit is in an active state where the communication implementation unit holds the communication channel.

A second feature of the present invention is summarized as a network apparatus which controls, via a radio base station, communications by a mobile station in which multiple applications are installed. Here, the mobile station is configured to bar communications by an application to be restricted to perform communications among the multiple applications, based on notification of reception of a communication restriction instruction to control communications of an application to be restricted or permitted, and application control information at least including identification information of the application to be restricted or permitted to perform communications among the multiple applications, and the network apparatus comprises a restriction instruction transmission unit configured to transmit the communication restriction instruction to the mobile station.

A third feature of the present invention is summarized as a mobile station which implements radio communications with a radio base station and in which multiple applications are installed, the mobile station including: an application control information holding unit configured to hold application control information at least including identification information of an application to be restricted or permitted to perform communications among the multiple applications; a restriction instruction reception unit configured to receive from a network apparatus via the radio base station a communication restriction instruction to control communications of an application to restrict or permit among the multiple applications; and a restriction instruction notification unit configured to notify an upper layer, which is configured to implement communications with the application, of reception of the communication restriction instruction based on the communication restriction instruction received by the restriction instruction reception unit.

In the first feature of the present invention, the upper layer of the mobile station may include a restriction implementation unit configured to bar communications by the application to be restricted to perform communications, based on notification of reception of the communication restriction instruction by the restriction instruction notification unit and the application control information held by the application control information holding unit.

A fourth feature of the present invention is summarized as a mobile communication method using: a mobile station which is configured to implement radio communications with a radio base station and in which multiple applications are installed; and a network apparatus configured to control communications by the mobile station via the radio base station, the mobile communication method including the steps of: causing the network apparatus to transmit the mobile station a communication restriction instruction to control communications of an application to be restricted or permitted among the multiple applications; causing the mobile station to receive the communication restriction instruction from the network apparatus via the radio base station; and causing the mobile station to notify an upper layer, which is configured to implement communications with the application, of reception of the communication restriction instruction based on the received communication restriction instruction.

In the first feature of the present invention, the mobile communication method may include the step of causing the upper layer of the mobile station to bar communications by the application to be restricted to perform communications, based on notification of reception of the communication restriction instruction, and application control information at least including identification information of an application to be restricted or permitted to perform communications among the multiple applications.

Note that the entire content of Japanese Patent Application No. 2012-160685 (filed on Jul. 19, 2012) is incorporated by reference in the present specification.

INDUSTRIAL APPLICABILITY

According to the characteristics of the present invention, can be provided a mobile communication system, a network apparatus, a mobile station, and a mobile communication method which enables a network to take initiative to control an application to be restricted or permitted to perform communications among applications installed in a mobile station such as a smartphone under state of disaster emergency or the like.

EXPLANATION OF THE REFERENCE NUMERALS 1 mobile communication system
5 IP network
10 application management server
11 application control information holding unit
13 application control information transmission unit
20A, 20B UE
21 application
22 application control information acquisition unit
23 application control information holding unit
24 restriction instruction reception unit
25 restriction instruction notification unit
26 restriction implementation unit
27 communication implementation unit
30 NB
40 RNC
41 application control information transmission unit
43 congestion state detection unit
45 restriction instruction transmission unit
50 SGSN
51 congestion state detection unit
53 restriction instruction transmission unit
60 GGSN
70 eNB
80 MME
90 HSS
100 SGW
101 congestion state detection unit
103 restriction instruction transmission unit
110 PGW

The invention claimed is:

1. A mobile communication system, comprising:
a mobile station which is configured to implement radio communications with a radio base station and in which a plurality of applications are installed; and
a network apparatus configured to control communications by the mobile station via the radio base station,
wherein the network apparatus comprises a restriction instruction transmission unit configured to transmit to the mobile station a communication restriction instruction to control communications of an application to be restricted or permitted, while the mobile station is in an idle state, among the plurality of applications,
the mobile station includes:
an application control information holding unit configured to hold application control information at least including identification information of an application to be restricted or permitted to perform communications among the plurality of applications;
a restriction instruction reception unit configured to receive the communication restriction instruction from the network apparatus via the radio base station; and
a restriction instruction notification unit configured to notify an upper layer of the mobile station, which is configured to implement communications with the application, of reception of the communication restriction instruction based on the communication restriction instruction received by the restriction instruction reception unit.

2. The mobile communication system according to claim 1, wherein the upper layer of the mobile station comprises a restriction implementation unit configured to bar communications by the application restricted to perform communications, based on notification that the communication restriction instruction has been received from the restriction instruction notification unit and the application control information held by the application control information holding unit.

3. The mobile communication system according to claim 1, wherein the mobile station comprises an application control information acquisition unit configured to acquire identification information of the application and the application control information including any of restriction or permission of communications.

4. The mobile communication system according to claim 3, wherein the application control information acquisition unit acquires the application control information further including a barring rate of the application.

5. The mobile communication system according to claim 3, wherein the application control information acquisition unit acquires the application control information via the radio base station.

6. The mobile communication system according to claim 1, wherein the restriction instruction transmission unit transmits a communication restriction instruction which at least includes any of the identification information and the barring rate of the application.

7. The mobile communication system according to claim 1, wherein the restriction instruction notification unit notifies the upper layer of priority of the mobile station relative to other mobile stations, together with reception of the communication restriction instruction.

8. The mobile communication system according to claim 2, wherein the restriction implementation unit judges whether or not a communication implementation unit which implements radio communications is in an idle state where the communication implementation unit does not hold a communication channel in a radio layer, and bars communications by the application to be restricted to perform communications, if the communication implementation unit is in the idle state.

9. The mobile communication system according to claim 8, wherein if a predetermined condition is met, the restriction implementation unit bars communications by the application to be restricted to perform communications, even if the communication implementation unit is in an active state where the communication implementation unit holds the communication channel.

10. A network apparatus which controls, via a radio base station, communications by a mobile station in which a plurality of applications are installed, wherein
the mobile station is configured to bar communications by an application to be restricted to perform communications among the plurality of applications, based on notification of reception of a communication restriction instruction to control communications of an application to be restricted or permitted while the mobile station is in an idle state, and application control information at least including identification information of the application to be restricted or permitted to perform communications among the plurality of applications, and
the network apparatus comprises a restriction instruction transmission unit configured to transmit the communication restriction instruction to the mobile station,
wherein the mobile station is further configured to notify an upper layer of the mobile station, which is configured to implement communications with the application, of reception of the communication restriction instruction.

11. A mobile station which implements radio communications with a radio base station and in which a plurality of applications are installed, the mobile station comprising:
an application control information holding unit configured to hold application control information at least including identification information of an application to be restricted or permitted while the mobile station is in an idle state to perform communications among the plurality of applications;
a restriction instruction reception unit configured to receive from a network apparatus via the radio base station a communication restriction instruction to control communications of an application to restrict or permit among the plurality of applications; and
a restriction instruction notification unit configured to notify an upper layer of the mobile station, which is configured to implement communications with the application, of reception of the communication restriction instruction based on the communication restriction instruction received by the restriction instruction reception unit.

12. The mobile station according to claim 11, wherein the upper layer of the mobile station comprises a restriction implementation unit configured to bar communications by the application to be restricted to perform communications, based on notification of reception of the communication restriction instruction by the restriction instruction notification unit and the application control information held by the application control information holding unit.

13. A mobile communication method using:
a mobile station which is configured to implement radio communications with a radio base station and in which a plurality of applications are installed; and
a network apparatus configured to control communications by the mobile station via the radio base station,
the mobile communication method comprising the steps of:
causing the network apparatus to transmit the mobile station a communication restriction instruction to control communications of an application to be restricted or permitted while the mobile station is in an idle state among the plurality of applications;
causing the mobile station to receive the communication restriction instruction from the network apparatus via the radio base station; and
causing the mobile station to notify an upper layer of the mobile station, which is configured to implement communications with the application, of reception of the communication restriction instruction based on the received communication restriction instruction.

14. The mobile communication method according to claim 13, comprising the step of causing the upper layer of the mobile station to bar communications by the application to be restricted to perform communications, based on notification of reception of the communication restriction instruction, and application control information at least including identification information of an application to be restricted or permitted to perform communications among the plurality of applications.

* * * * *